US008954036B2

(12) United States Patent
Kojo et al.

(10) Patent No.: US 8,954,036 B2
(45) Date of Patent: Feb. 10, 2015

(54) DATA ARRIVAL CONTROL SERVER AND METHOD FOR NOTIFYING A COMMUNICATION TERMINAL OF A PLURALITY OF COMMUNICATION TERMINALS OF DATA ARRIVAL AT A CERTAIN COMMUNICATION TERMINAL OF THE PLURALITY OF COMMUNICATION TERMINALS

(75) Inventors: Yu Kojo, Setagaya-ku (JP); Masami Yabusaki, Kashiwa (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 748 days.

(21) Appl. No.: 13/142,242

(22) PCT Filed: Dec. 22, 2009

(86) PCT No.: PCT/JP2009/007123
§ 371 (c)(1),
(2), (4) Date: Jun. 24, 2011

(87) PCT Pub. No.: WO2010/073622
PCT Pub. Date: Jul. 1, 2010

(65) Prior Publication Data
US 2011/0256900 A1 Oct. 20, 2011

(30) Foreign Application Priority Data
Dec. 25, 2008 (JP) .................................. 2008-330722

(51) Int. Cl.
*H04M 1/725* (2006.01)
*H04L 12/58* (2006.01)
(Continued)

(52) U.S. Cl.
CPC .............. *H04L 12/587* (2013.01); *H04L 51/24* (2013.01); *H04M 3/537* (2013.01);
(Continued)

(58) Field of Classification Search
None
See application file for complete search history.

(56) References Cited

U.S. PATENT DOCUMENTS 7,215,946 B1 * 5/2007 Cardina et al. ............. 455/412.2
2004/0213212 A1 10/2004 Reding et al.
(Continued)

FOREIGN PATENT DOCUMENTS

CN 101166357 A 4/2008
JP 05-145640 A 6/1993
(Continued)

OTHER PUBLICATIONS

Morimoto, Call Arrival Notification System and Call Arrival Notification Method, Oct. 31, 2003, English translation of Japanese patent document JP 2003-309878, pp. 1-30.*
(Continued)

*Primary Examiner* — Nay A Maung
*Assistant Examiner* — Alejandro Rivero
(74) *Attorney, Agent, or Firm* — Crowell & Moring LLP

(57) ABSTRACT

There are provided a data arrival control server and a data arrival control method, whereby in a case where an identical user uses plural communication terminals, even if a data-receiving terminal is powered off, it is made possible to know with another communication terminal that there is a data arrival at the data-receiving terminal. A data arrival notification unit 143 of a data arrival control server 10 notifies a data arrival notification target terminal 20 that there is the data arrival at a data-receiving terminal 30, when there is the data arrival at the data-receiving terminal 30.

9 Claims, 11 Drawing Sheets

(51) Int. Cl.
*H04M 3/537* (2006.01)
*H04M 3/42* (2006.01)
*H04M 3/46* (2006.01)

(52) U.S. Cl.
CPC ........ *H04L 12/5855* (2013.01); *H04L 12/5895* (2013.01); *H04M 3/42382* (2013.01); *H04M 3/465* (2013.01); *H04M 2207/18* (2013.01)
USPC ...................... 455/412.2; 455/414.1; 709/206

(56) References Cited

U.S. PATENT DOCUMENTS

| | | | |
|---|---|---|---|
| 2005/0018833 A1 | 1/2005 | Wang et al. | |
| 2006/0189300 A1* | 8/2006 | Hwang et al. | 455/412.2 |
| 2006/0271679 A1* | 11/2006 | Mousseau et al. | 709/224 |
| 2009/0054091 A1* | 2/2009 | van Wijk et al. | 455/466 |
| 2009/0201842 A1 | 8/2009 | Guan | |

FOREIGN PATENT DOCUMENTS

| | | | |
|---|---|---|---|
| JP | 8-503107 A | 4/1996 | |
| JP | H09-55982 A | 2/1997 | |
| JP | 11-191800 A | 7/1999 | |
| JP | 2000-069149 A | 3/2000 | |
| JP | 2001-503931 A | 3/2001 | |
| JP | 2002-335567 A | 11/2002 | |
| JP | 2003-309878 A | 10/2003 | |
| JP | 2004-193697 A | 7/2004 | |
| JP | 2005-026995 A | 1/2005 | |
| JP | 2005-57462 A | 3/2005 | |
| JP | 2007-281811 A | 10/2007 | |
| JP | 2007-306393 A | 11/2007 | |
| JP | 2008-104067 A | 5/2008 | |
| WO | WO 2007/034041 A1 | 3/2007 | |

OTHER PUBLICATIONS

Japanese Office Action dated Dec. 24, 2013, with English translation (Nine (9) pages).
Japanese Office Action dated Mar. 19, 2013 with English translation (Ten (10) pages).
Chinese Office Action dated May 29, 2013, with English translation (Nineteen (19) pages).
PCT/JP2009/007123 PCT/IB/338, 1 page.
PCT/JP2009/007123 PCT/IB/373, 1 page.
PCT/JP2009/007123 PCT/ISA/237 (Translation), 6 pages.
Chinese Office Action dated Oct. 21, 2013, with machine English translation (Thirteen (13) pages).
Decision for Dismissal of Amendment of Japan Patent Office dated Mar. 25, 2014, with English translation (Six (6) pages).
Decision of Rejection of Japan Patent Office dated Mar. 25, 2014, with English translation (Two (2) pages).
Japanese Pretrial Report dispatched Aug. 26, 2014, with English translation (Six (6) pages).
Japanese Notification of Pretrial Reexamination Release dispatched Aug. 26, 2014, with English translation (Two (2) pages).
Supplementary European Search Report dated Nov. 10, 2014 (Seven (7) pages).

* cited by examiner

F I G. 6
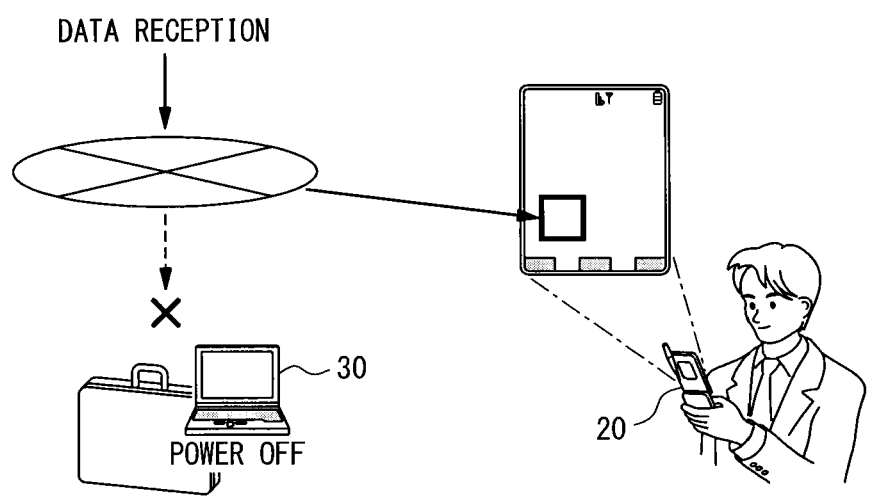

DATA ARRIVAL CONTROL SERVER AND METHOD FOR NOTIFYING A COMMUNICATION TERMINAL OF A PLURALITY OF COMMUNICATION TERMINALS OF DATA ARRIVAL AT A CERTAIN COMMUNICATION TERMINAL OF THE PLURALITY OF COMMUNICATION TERMINALS

TECHNICAL FIELD

The present invention relates to a data arrival control server for controlling an arrival of data at the time of a data arrival, and a data arrival control method.

BACKGROUND ART

In recent years, various types of communication terminals have been developed. Examples are cellular phones as a beginning, smartphones that are cellular phones equipped with Personal Digital Assistant (PDA) functionality, personal computers, notebook-type personal computers (also known as "notebook PC"), portable navigation terminals, Ultra Mobile Personal Computers (UMPC) that are notebook PCs that are further downsized, and so on and so forth.

With the increase in the type of such communication terminals, there are an increasing number of users who use plural communication terminals. It is often the case that a user who has plural communication terminals uses different communication terminals creatively depending on the intended use. While the user's convenience is improved by using plural communication terminals, the following inconvenience occurs. That is, when there is a data transmission such as a telephone call or an e-mail to a communication terminal, which is powered off (power is OFF) or a so-called PULL-type application for merely making a response to an inquiry without having a function of receiving a call or data (hereinafter, collectively referred to as "data arrival"), out of plural communication terminals used by an identical user, the user is not able to know the data arrival even if the user carries the communication terminal in standby mode with himself/herself all the time, such as a mobile telephone.

As a technique of controlling a data arrival in cooperation with plural communication terminals, an example is disclosed in Patent Documents 1 to 3. Patent Document 1 discloses that even if there is a data arrival to any one of plural user addresses owned by a user, the data arrival is made to prescribed one of the terminals without exception.

Patent Document 2 discloses that in a case where a user has a host terminal capable of making a telephone call and a mobile terminal, only the mobile terminal is made into standby mode with the host terminal being powered off. When there is a data arrival at the mobile terminal, a ring tone is made from the mobile terminal. When a talk button of the host terminal is pushed, the host terminal is powered on to make the telephone call possible with the use of the host terminal, whereby the power can be saved.

Moreover, Patent Document 3 discloses that one of plural mobile communication terminals is set as an effective terminal. When there is a data arrival from the outside at each of the mobile communication terminals that is not set as the effective terminal, a notification of data arrival is made to the effective terminal.

PRIOR ART DOCUMENTS

Patent Documents

Patent Document 1: JP 2005-57462 A
Patent Document 2: JP 2004-193697 A
Patent Document 3: JP 2008-104067 A

SUMMARY OF THE INVENTION

Problem to be Solved by the Invention

It should be noted that, however, in Patent Document 1, the terminal that receives the data arrival is changed. Hence, for example, there is a problem in the management of the telephone call history or e-mail history. Besides, if the communication terminal to which the destination of the data arrival is changed is not capable of receiving the telephone call or e-mail, it is impossible to utilize the technique.

In addition, in order to achieve the technique disclosed in Patent Document 2, it is necessary for both of the data-receiving terminal and the host terminal to have a telephone call function, so that an ad-hoc communication should be performed between the data-receiving terminal and the host terminal.

Furthermore, in the technique disclosed in Patent Document 3, when there is a data arrival at a terminal other than the effective terminal, the terminal other than the effective terminal notifies the effective terminal that there is a data arrival. However, if the terminal that receives the data arrival is powered off, it is impossible to make a notification of the data arrival.

The present invention has been made to solve the above problems, and has an object to provide a data arrival control server and a data arrival control method, whereby in a case where an identical user uses plural communication terminals, even if a data-receiving terminal is powered off, it is made possible to know with another communication terminal that there is a data arrival at the data-receiving terminal.

Solution to the Problem

In order to solve the above problems, the present invention proposes a server and a method to be described in the following.

According to an aspect of the present invention, there is provided a data arrival control server for controlling a data arrival, when there is the data arrival at any one of a plurality of communication terminals used by a user, the data arrival control server comprising: a data arrival notification unit for, when there is the data arrival at a first communication terminal of the plurality of communication terminals used by the user, performing a data arrival notification process of notifying a second communication terminal that there is the data arrival at the first communication terminal of the plurality of communication terminals.

According to the present invention, when there is the data arrival at the first communication terminal of plurality of communication terminals used by the user, the data arrival control server performs the data arrival notification process of notifying the second communication terminal predetermined beforehand that there is the data arrival at the first communication terminal of the plurality of communication terminals. Therefore, even if the first communication terminal is powered off, the user is able to know that there is the data arrival at the first communication terminal, from the data arrival notification made to the second communication terminal.

The above data arrival control server may further comprise: a terminal state holding unit for storing a state of each of the plurality of communication terminals; and a data-receiving terminal state determination unit for, when there is the data arrival at the first communication terminal, determining whether or not the first terminal is capable of receiving data based upon the state of said each of the plurality of communication terminals, wherein the data arrival notification unit performs the data arrival notification process, when the data-receiving terminal state determination unit determines that the first communication terminal is not capable of receiving the data.

According to the present invention, the data arrival notification process is performed only when the first communication terminal is not capable of receiving data. Therefore, the user is able to know in real time that the there is a data arrival at the first communication terminal and is able to make a response to the fact that the first communication is not capable of receiving data.

The above data arrival control server may further comprise a user setting information holding unit for storing user setting information representing a condition, for the data arrival notification process, set by the user, wherein the data arrival notification unit performs the data arrival notification process on the condition represented by the user setting information, for the first communication terminal, stored in the user setting information holding unit, when there is the data arrival at the first communication terminal.

According to the present invention, the condition for the data arrival notification process is stored beforehand in the user setting information holding unit, thereby allowing the user to receive the data arrival notification on a desired condition.

In the above data arrival control server, the user setting information may include information representing a data transmitter, a data type, a data transmitting condition, and a communication terminal to be notified that there is the data arrival in a case where the data transmitting condition is satisfied, when there is the data arrival having the data type from a communication terminal used by the data transmitter.

According to the present invention, it is possible to store, in the user setting information holding unit, information representing a data transmitter, a data type, a data transmitting condition, and a communication terminal to be notified that there is the data arrival in a case where the data transmitting condition is satisfied, when there is the data arrival having the data type from a communication terminal used by the data transmitter. Therefore, the user is able to receive the data arrival notification on a desired condition.

In the above data arrival control server, the data transmitting condition may be that the first communication terminal is powered off.

According to the present invention, the user is able to know that there is the data arrival at the first communication terminal that is powered off, from the data arrival notification to the second communication terminal.

The above data arrival control server may further comprise: a terminal identifier management unit for managing a terminal identifier assigned to the first communication terminal and a service-specific identifier to be used when the user who uses the first communication terminal receives a prescribed type of communication service, in association with each other; and a transmission destination terminal identifier derivation unit for deriving the terminal identifier from the service-specific identifier, based upon data managed by the terminal identifier management unit, when there is the data arrival with the service-specific identifier as a destination.

According to the present invention, the data arrival control server derives the terminal identifier from the service-specific identifier, when there is a data arrival including the service-specific identifier as a destination. Accordingly, it is possible to apply to not only telephone calls but also data arrivals at user-specific identifiers provided by various communication services. In addition, it is made possible to make a data arrival notification to a user, even in a case where there is no data arrival notification means like a PULL type application such as an e-mail.

The above data arrival control server may further comprise: a guidance transmission unit for transmitting a guidance of notifying a data-originating device that it is possible to make a response, in receipt of a reply that it is possible to make a response to a telephone call notification from the data arrival notification unit; and a connection unit for connecting a line of contact between the data-originating device and the first communication terminal, when there is a reply from the first communication terminal.

According to the present invention, while guidance is being output from the data-originating device after the data arrival control server transmits the guidance to the data-originating device, the user is able to operate the first communication terminal to make a response to the data arrival.

The above data arrival control server may further comprise a message-recording transfer unit for transferring the data arrival to a message-recording center having a recording device capable of recording a voice message to the first communication terminal, in receipt of the reply that it is not possible to make a response to a telephone call notification from the data arrival notification unit.

According to the present invention, the user operates the second communication terminal that has received the data arrival notification to make a response that a reply is impossible. Then, the data arrival control server transfers the data arrival at the first communication terminal to the message-recording center, thereby improving the convenience of the user.

According to another aspect of the present invention, there is provided a data arrival control method for controlling a data arrival, when there is the data arrival at any one of a plurality of communication terminals used by a user, the data arrival control method comprising: when there is the data arrival at a first communication terminal of the plurality of communication terminals used by the user, performing a data arrival notification process of notifying a second communication terminal that there is the data arrival at the first communication terminal of the plurality of communication terminals.

According to the present invention, when there is the data arrival at the first communication terminal of plurality of communication terminals used by the user, the data arrival control server performs the data arrival notification process of notifying the second communication terminal predetermined beforehand that there is the data arrival at the first communication terminal of the plurality of communication terminals. Therefore, even if the first communication terminal is powered off, the user is able to know that there is the data arrival at the first communication terminal, from the data arrival notification made to the second communication terminal.

In the above data arrival control server, the data arrival notification unit may perform the data arrival notification process by use of a terminal identifier for uniquely identifying the second communication terminal in a communication network where the second communication terminal is located, and the terminal identifier includes a common terminal identifier capable of uniquely identifying the second communication terminal in each of a plurality of communication networks operated by different communication operators, respectively.

According to the present invention, even when the communication terminals are located in different coverage areas operated by different communication operators, respectively, the data arrival control server is capable of making a data arrival notification with the use of a common terminal identifier.

According to yet another aspect of the present invention, there is provided a data arrival control server for controlling a data arrival in a case where there is the data arrival at any one of a plurality of applications, each limiting a communication network for receiving a service, stored at a communication terminal capable of accessing a plurality of communication networks, the data arrival control server comprising a data arrival notification unit for, when there is the data arrival at a first application capable of receiving the service via a prescribed communication network of the plurality of communication networks, notifying a second application of the plurality of applications that there is the data arrival at the first application via a communication network where the second application is capable of receiving a service.

According to the present invention, the data arrival control server notifies the second application of the plurality of applications that there is the data arrival at the first application via the communication network where the second application is capable of receiving the service, when there is the data arrival at a first application capable of receiving the service via a prescribed communication network of the plurality of communication networks. Accordingly, even if the first application does not have a function of a data arrival notification, the user is able to know that there is the data arrival via a prescribed communication network.

In the above data arrival control server, the data arrival notification unit may notify, when there is the data arrival at the first application via the prescribed communication network and the communication terminal is not capable of accessing the prescribed communication network, the second application capable of receiving a communication service from another communication network to which the communication terminal is capable of making an access via said another communication network that there is the data arrival at the first application via the prescribed communication network.

According to the present invention, in a case where the communication terminal is not in the state of capable of accessing a prescribed communication network and the first application is not capable of receiving the data arrival, the user is able to know that there is the data arrival of a service via the prescribed communication network.

According to the present invention, in a case where the communication terminal is not in the state of capable of accessing a prescribed communication network and the first application is not capable of receiving the data arrival, the user is able to know that there is the data arrival of a service via the prescribed communication network.

Advantageous Effects of the Invention

According to the present invention, when there is the data arrival at certain communication terminal of plurality of communication terminals used by the user, the data arrival control server performs the data arrival notification process of notifying the other communication terminal predetermined beforehand that there is the data arrival at the certain communication terminal of the plurality of communication terminals. Therefore, even if the certain communication terminal is powered off, the user is able to know that there is the data arrival at the first communication terminal, from the data arrival notification made to the other communication terminal.

BRIEF DESCRIPTION OF THE DRAWINGS

FIG. 6 is a diagram illustrative of an operation example of the data arrival notification process according to the embodiment of the present invention;

DESCRIPTION OF EMBODIMENTS

Figure 1:
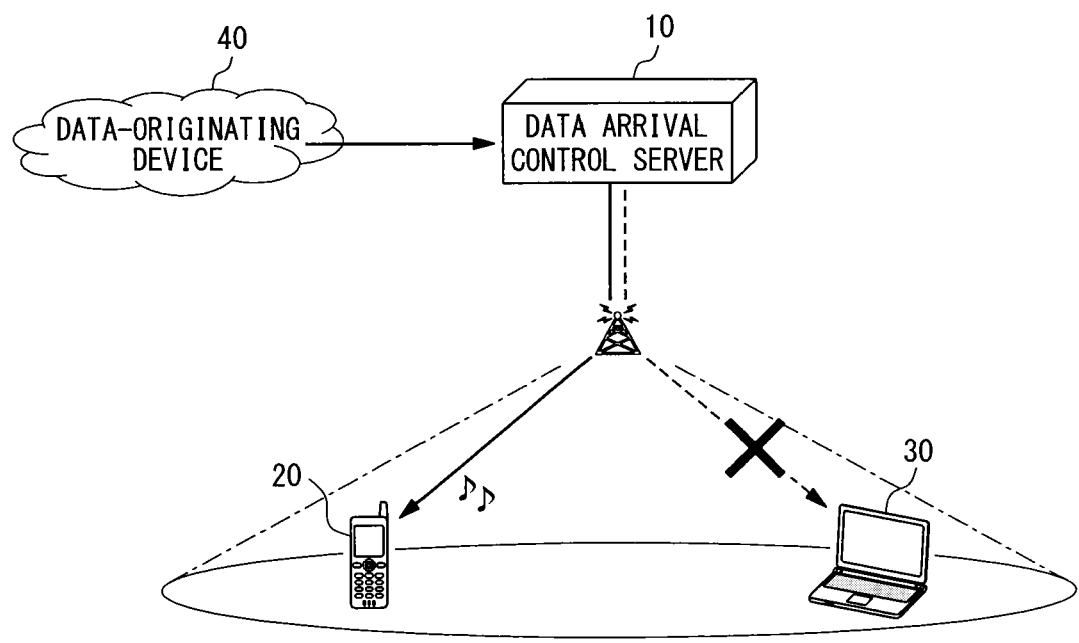
FIG. 1 is a diagram illustrative of the whole configuration of a communication network according to an embodiment of the present invention.

Embodiments of the present invention will be described with reference to the attached drawings. In each of the drawings to be referred to in the description below, the same components have the same reference numerals in the drawings.

(Configuration of the Whole System)

FIG. 1 is a diagram illustrative of the whole configuration of a communication network according to an embodiment of the present invention. Referring to FIG. 1, the communication network according to the present embodiment is provided with: a data-originating device 40 that is a source of data or a telephone call; a data-receiving terminal 30 that is a destination of a data arrival; a data arrival control server 10 for controlling the data arrival at the time of delivering data; and a data arrival notification target terminal 20 that is a target of a data arrival notification. The data arrival notification target terminal 20 and the data-receiving terminal 30 each are some types of communication terminals used by an identical user. Herein, the communication terminal used by the user may be a mobile terminal or a smartphone to which a user-specific identifier is assigned, may be a personal computer owned by the user, or may be a personal computer borrowed from the office to be used by the user. Additionally, the "data arrival" includes arrival of telephone call, arrival of e-mail, arrival of notification data made by an application function among a wide range of users and between a user and a server such as a message exchanged between users in a scheduler or in an SNS service.

(Configuration of Data Arrival Control Server)

Figure 2:
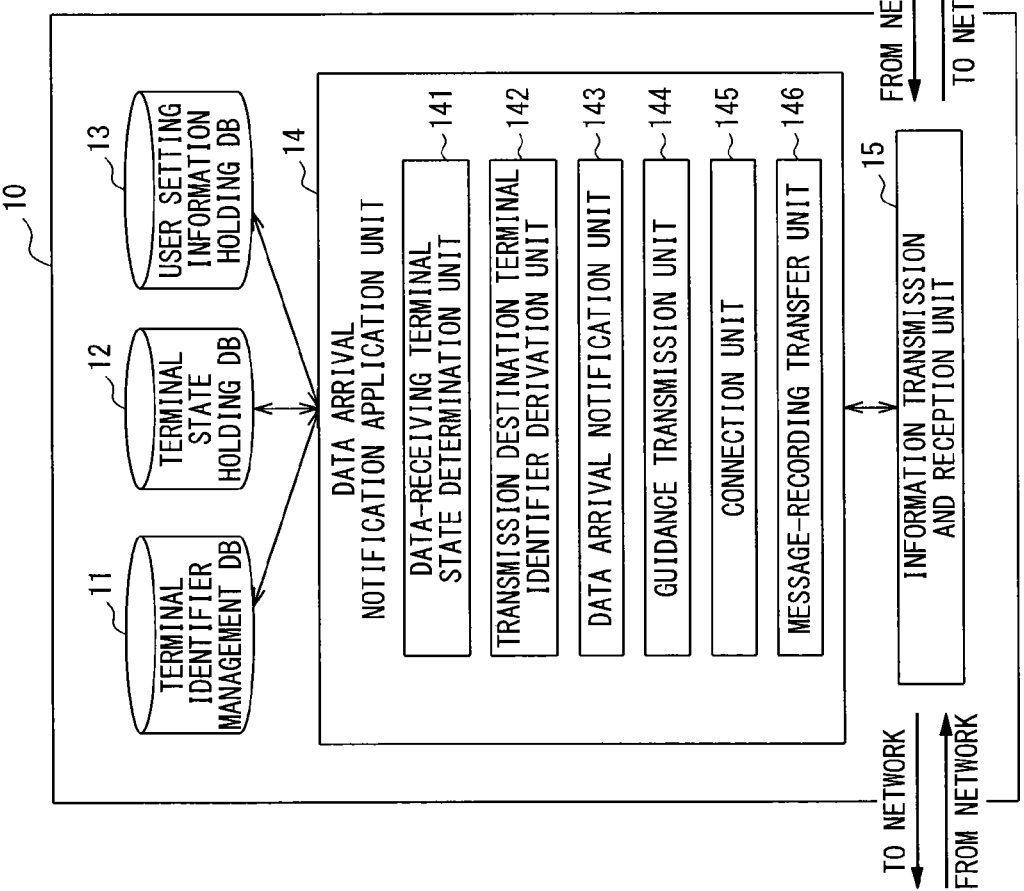
FIG. 2 is a block diagram illustrative of the configuration of a data arrival control server according to the embodiment of the present invention.

Next, the configuration of the data arrival control server 10 will be described. FIG. 2 is a block diagram illustrative of the configuration of the data arrival control server 10. Referring to FIG. 2, the data arrival control server 10 is provided with: a terminal identifier management database (DB) 11; a terminal state holding DB 12; and a user setting information holding DB 13, which are installed in a memory device such as a hard disk or the like, not illustrated; a data arrival notification application unit 14 implemented by the Central Processing Unit (CPU), not illustrated, executing various application programs; and an information transmission and reception unit 15 including a communication interface, not illustrated.

Figure 3C:
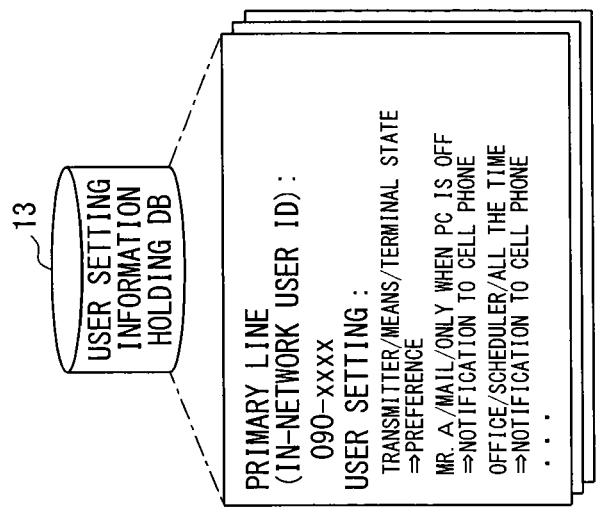
FIG. 3C is a diagram illustrative of an example of data stored in a user setting information holding DB.

Firstly, referring to FIG. 3A to FIG. 3C, the databases 11, 12, and 13 provided in the data arrival control server 10 will be described.

(Terminal Identifier Management DB)

The terminal identifier management DB 11 manages a service-specific identifier that is used when a user who uses a communication terminal receives the provision of a prescribed type of communication service, a telephone number of the primary line to be a user identifier in a mobile communication network, and a terminal identifier assigned to the communication terminal, in association with each other. FIG. 3A illustrates an example of data managed by the terminal identifier management DB 11.

Herein, the terminal identifier denotes an identifier assigned to a communication terminal by a mobile communication service operator so as to provide mobile communication services in the mobile communication network, and corresponds to an IMUI (International Mobile User Identity) as an example.

The service-specific identifier denotes an e-mail address to be used when using the e-mail service provided by an Internet Service Provider, for example, or an online name to be used when using a Web service such as a Social Networking Service (SNS) or the like.

(Terminal State Holding DB)

The terminal state holding DB 12 stores a state of a communication terminal identified by the terminal identifier, in association with a terminal identifier. The state of the communication terminal includes, for example, power is OFF, in connection, and the like. These states of the communication terminal are registered based upon signals successively transmitted from the communication terminal.

Figure 3B:
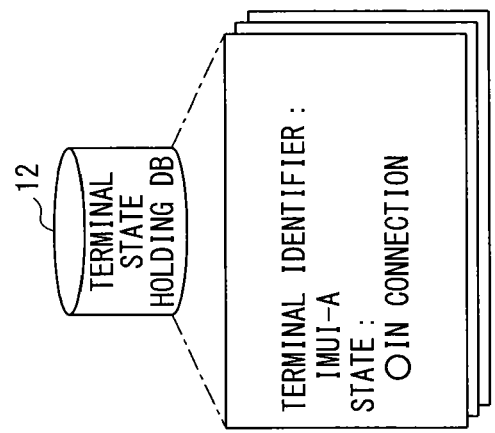
FIG. 3B is a diagram illustrative of an example of data stored in a terminal state holding DB.
Figure 3A:
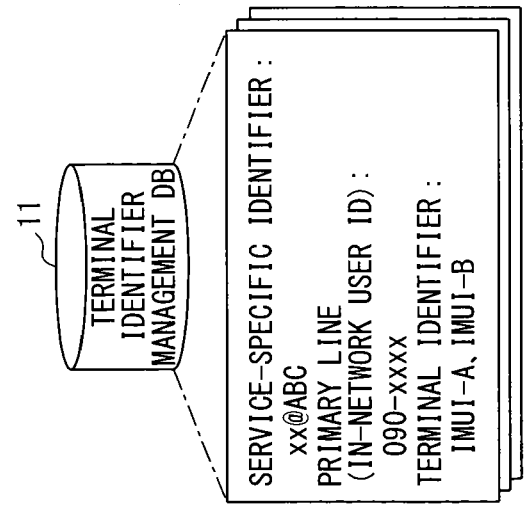
FIG. 3A is a diagram illustrative of an example of data stored in a terminal identifier management DB.

FIG. 3B illustrates an example of data stored in the terminal state holding DB 12.

Based upon the state stored in the terminal state holding DB 12, it is possible to determine whether or not the communication terminal identified by the terminal identifier in association with the state is capable of receiving data. For example, when the state is "in connection", it is determined that the data reception is possible. When the state is "power is OFF", it is determined that the data reception is impossible.

(User Setting Information Holding DB)

The user setting information holding DB 13 stores user setting information representing conditions for a data arrival notification that has been set by the user. The user setting information includes information representing a data transmitter, a data type, a data transmitting condition, and the data arrival notification target terminal 20 to be notified that there is a data arrival in a case where the data transmitting condition is satisfied when there is an arrival of data having the above data type from the communication terminal used by the data transmitter. The "type of data" includes a telephone call, an e-mail, and a data update notification used by application software such as a scheduler. Additionally, the "data transmitting condition" includes a condition that the data-receiving terminal 30 is powered OFF, a condition that the data-receiving terminal 30 does not have a receiving function of PUSH type data, a condition that the data-receiving terminal 30 is a prescribed type of communication terminal such as a personal computer, and a condition that the state of the data-receiving terminal 30 is arbitrary.

FIG. 3C illustrates an example of the user setting information stored in the user setting information holding DB 13, in a case where the data-receiving terminal 30 is a personal computer and the data arrival notification target terminal 20 is a mobile terminal. Referring to FIG. 3C, the user setting information holding DB 13 stores an in-network user ID for identifying the data-receiving terminal 30 and the user setting information in association with each other. The user setting information indicates that an e-mail arrival notification is made to the data arrival notification target terminal 20, when there is an arrival of e-mail from the data-originating device 40 used by Mr. A to the data-receiving terminal 30 and the data-receiving terminal 30 is powered OFF. The user setting information also indicates that a data arrival notification is made to the data arrival notification target terminal 20, regardless of the state of the data-receiving terminal 30, when there is an update notification of schedule data used by the scheduler held by the data-originating device 40 installed in the user's office, to the data-receiving terminal 30.

Specifically, the user setting information is not limited to the above examples. The user setting information may be information indicating that a data arrival notification is unnecessary, when data is transmitted from a specific transmitter or a specific type of data is arrived.

(Data Arrival Notification Application Unit)

Next, the data arrival notification application unit 14 illustrated in FIG. 2 will be described. The data arrival notification application unit 14 is provided with: a data-receiving terminal state determination unit 141; a transmission destination terminal identifier derivation unit 142; a data arrival notification unit 143; a guidance transmission unit 144; a connection unit 145; and a message-recording transfer unit 146.

The data-receiving terminal state determination unit 141 acquires the state of the data-receiving terminal 30 stored in the terminal state holding DB 12, when there is a data arrival at the data-receiving terminal 30, and determines whether or not the data-receiving terminal 30 is capable of receiving the data based upon the acquired state. In a case where the acquired state is "power is ON" or "in connection", it is determined that the data reception is possible.

The transmission destination terminal identifier derivation unit 142 derives the terminal identifier of the data-receiving terminal 30 from the service-specific identifier, based upon the data managed in the terminal identifier management DB 11, when there is an arrival of data with the service-specific identifier as a destination.

When there is a data arrival at the data-receiving terminal 30, the data arrival notification unit 143 performs a data arrival notification process to the data arrival notification target terminal 20 by means of voices, a vibration function, or a screen display.

At this chance, the data arrival notification unit 143 performs the data arrival notification process, only when the data-receiving terminal state determination unit 141 determines that the data-receiving terminal 30 is not capable of receiving data. In addition, the data arrival notification unit 143 determines whether or not there is a need to make a data arrival notification, in accordance with the condition represented by the user setting information stored in the user setting information holding DB 13 in association with the in-network user ID of the data-receiving terminal 30. When determining that there is a need to make the data arrival notification, the data arrival notification unit 143 makes the data arrival notification. Furthermore, when there is an arrival of the data with the service-specific identifier as a destination, the data arrival notification unit 143 acquires the terminal identifier derived by the transmission destination terminal identifier derivation unit 142, and searches the terminal state holding DB 12 with the acquired terminal identifier as a key.

In receipt of a reply from the data arrival notification target terminal 20 that the data arrival notification target terminal 20 is capable of making response to the notification of a telephone call to the data arrival notification target terminal 20 from the data arrival notification unit 143, the guidance transmission unit 144 transmits to the data-originating device 40 a special guidance for notifying of being capable of making a response. An example is "currently preparing for making a response, please wait for a while".

The connection unit 145 connects the line of contact between the data-originating device 40 and the data-receiving terminal 30 for a data arrival at the data-receiving terminal 30, when there is a response to the data arrival from the data-receiving terminal 30.

When the data arrival notification unit 143 notifies the data arrival notification target terminal 20 that there is a telephone call to the data-receiving terminal 30 and the message-recording transfer unit 146 receives from the data arrival notification target terminal 20 a reply that it is impossible to make a response to the telephone call, the message-recording transfer unit 146 transfers the telephone call to a message-recording center, not illustrated. The message-recording center is a device that transmits to the data-originating device 40 a guidance of connecting to the message-recording center to make recordable a voice message for the data-receiving terminal 30, and that includes a recording device for recording the voice message from the data-originating device 40.

(Configuration of Data Arrival Notification Target Terminal)

Figure 4:
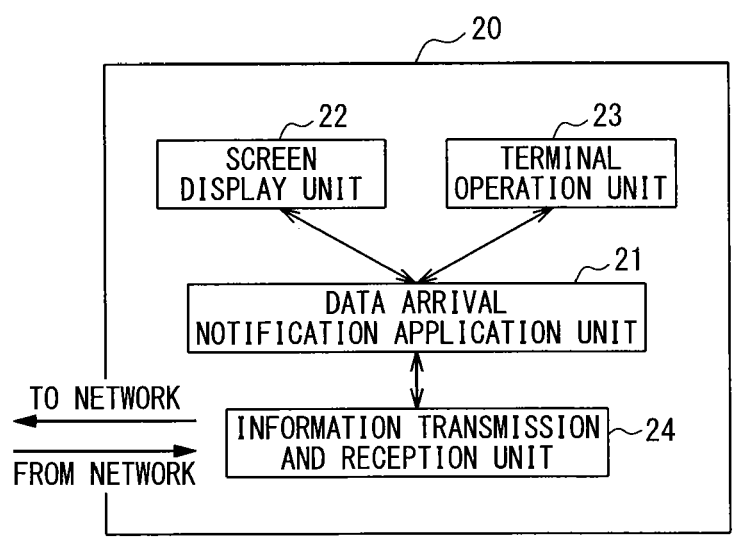
FIG. 4 is a block diagram illustrative of the configuration of the a data arrival notification target terminal according to the embodiment of the present invention.

Next, the configuration of the data arrival notification target terminal 20 will be described. FIG. 4 is a block diagram illustrative of the configuration of the data arrival notification target terminal 20. Referring to FIG. 4, the data arrival notification target terminal 20 includes: an information transmission and reception unit 24 composed of a communication interface, not illustrated; a data arrival notification application unit 21 realized by the CPU, not illustrated, executing various application programs stored in a memory device such as a non-volatile memory; a screen display unit 22 including a liquid crystal display, not illustrated; and a terminal operation unit 23 including operation keys, not illustrated, for operating various operations for a signal transmission, a response to a data arrival, power ON/OFF, and the like.

In receipt of a data arrival notification for notifying that there is a data arrival at the data-receiving terminal 30 from the data arrival control server 10 via the information transmission and reception unit 24, the data arrival notification application unit 21 of the data arrival notification target terminal 20 displays on the screen display unit 22 a screen for causing the user to choose whether or not it is possible to make a response. In a case where the user chooses that it is possible to make a response by operating the terminal operation unit 23, the data arrival notification application unit 21 transmits the notification that it is possible to make a response via the information transmission and reception unit 24 to the data arrival control server 10. On the other hand, in a case where the user chooses that it is not possible to make a response, the data arrival notification application unit 21 performs a data arrival transfer process to the message-recording center or performs a message transmission process to the data-originating device 40, depending on the user's input operation.

(Configuration of Data-Receiving Terminal)

The data-receiving terminal 30 is provided with a hardware configuration substantially similar to that of the data arrival notification target terminal 20. The memory device of a non-volatile memory or the like stores software for accomplishing functionality of a general mobile terminal for responding to a telephone call, e-mail, and various data.

(Configuration of Data-Originating Device)

The data-originating device 40 is a mobile terminal or a personal computer capable of originating a telephone call or transmitting an e-mail. Specifically, the data-originating device 40 may be a server for providing groupware-type services for notifying that schedule data to be used for application software such as a scheduler has been updated, for notifying that an item listed on an auction has become the predetermined price, and the like.

(Data Arrival Notification Process)

Next, referring to FIG. 5, a description will be given of a data arrival notification process to be performed by the data arrival control server 10, when there is a data arrival at the data-receiving terminal 30 from the data-originating device 40.

Firstly, the data-originating device 40 originates a signal transmission or data transmission to the data-receiving terminal 30 (step S101).

The information transmission and reception unit 15 of the data arrival control server 10 receives a data arrival signal from the data-originating device 40. In a case where the data arrival signal includes a service-specific identifier, the transmission destination terminal identifier derivation unit 142 refers to the terminal identifier management DB 11 and derives the terminal identifier from the service-specific identifier (step S102).

Next, the data-receiving terminal state determination unit 141 acquires the state of the data-receiving terminal 30 stored in the terminal state holding DB 12 in association with the terminal identifier, and determines whether or not the signal received from the data-originating device 40 can be transmitted to the data-receiving terminal 30 based upon the acquired state (step S103).

When the data-receiving terminal state determination unit 141 determines that the signal can be transmitted, the data arrival control server 10 transmits the reception signal via the information transmission and reception unit 15 to the data-receiving terminal 30 (step S104).

In contrast, when the data-receiving terminal state determination unit 141 determines that the signal cannot be transmitted or that it is uncertain whether or not the signal can be transmitted, the data arrival notification application unit 14 of the data arrival control server 10 refers to the user setting information holding DB 13 to confirm the user setting information on the data arrival notification (step S105). It is determined whether or not it is necessary to make a data arrival notification on the condition represented by the user setting information that has been confirmed. When determining that it is necessary to make the data arrival notification, the data arrival notification unit 143 generates a data arrival notification signal on the condition represented by the user setting information, and transmits the data arrival notification signal that has been generated via the information transmission and reception unit 15 to the data arrival notification target terminal 20 (step S107).

Additionally, when determining that it is not necessary to make the data arrival notification, the data arrival notification process in cooperation with the data arrival notification target terminal 20 is not performed. A process is separately performed for the data-receiving terminal 30 in a conventional manner (step S106).

By performing the data arrival control process as described above, for example, as illustrated in FIG. 6, when there is a data arrival at the data-receiving terminal 30 with the data-receiving terminal 30 being powered off, a PICT display or the like is made at the data arrival notification target terminal 20 to notify of the data arrival at the data-receiving terminal 30. This allows the user to know in real time that there is a data arrival.

(Data Arrival Response Process)

Next, referring to a sequence chart of FIG. 7, a data arrival response process subsequent to the data arrival notification process illustrated in FIG. 5 will be described. In the present example, it is assumed that the data-originating device 40 and the data-receiving terminal 30 are each a mobile terminal, and the data arrival notification target terminal 20 is a smartphone. Then, it is also assumed that the user is working at the data arrival notification target terminal 20 and the data-receiving terminal 30 is put into a user's bag with being powered off, when the data-originating device 40 originates a signal transmission to the data-receiving terminal 30.

Figure 5:
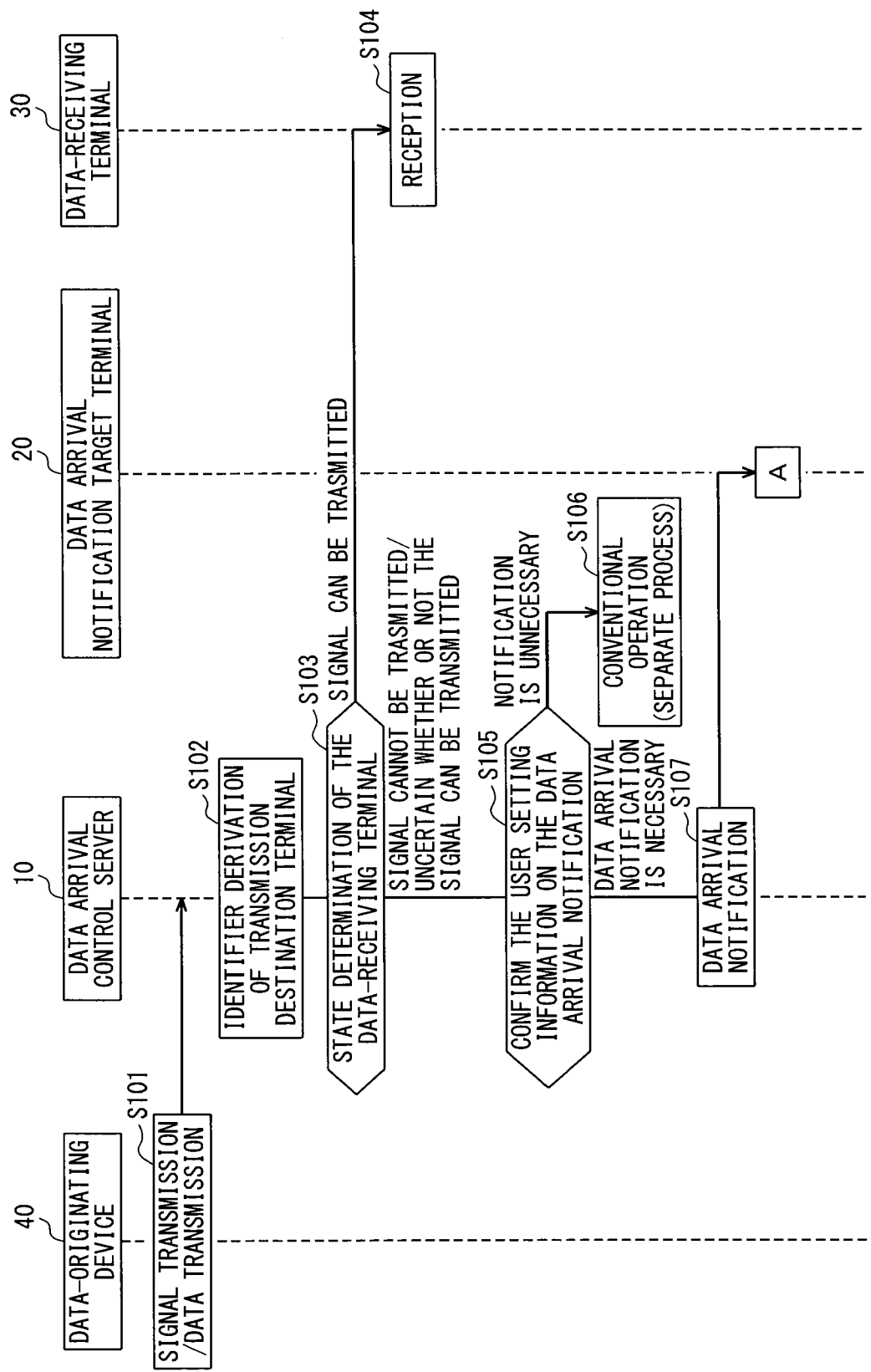
FIG. 5 is a sequence chart illustrative of the data arrival notification process according to the embodiment of the present invention.
Figure 7:
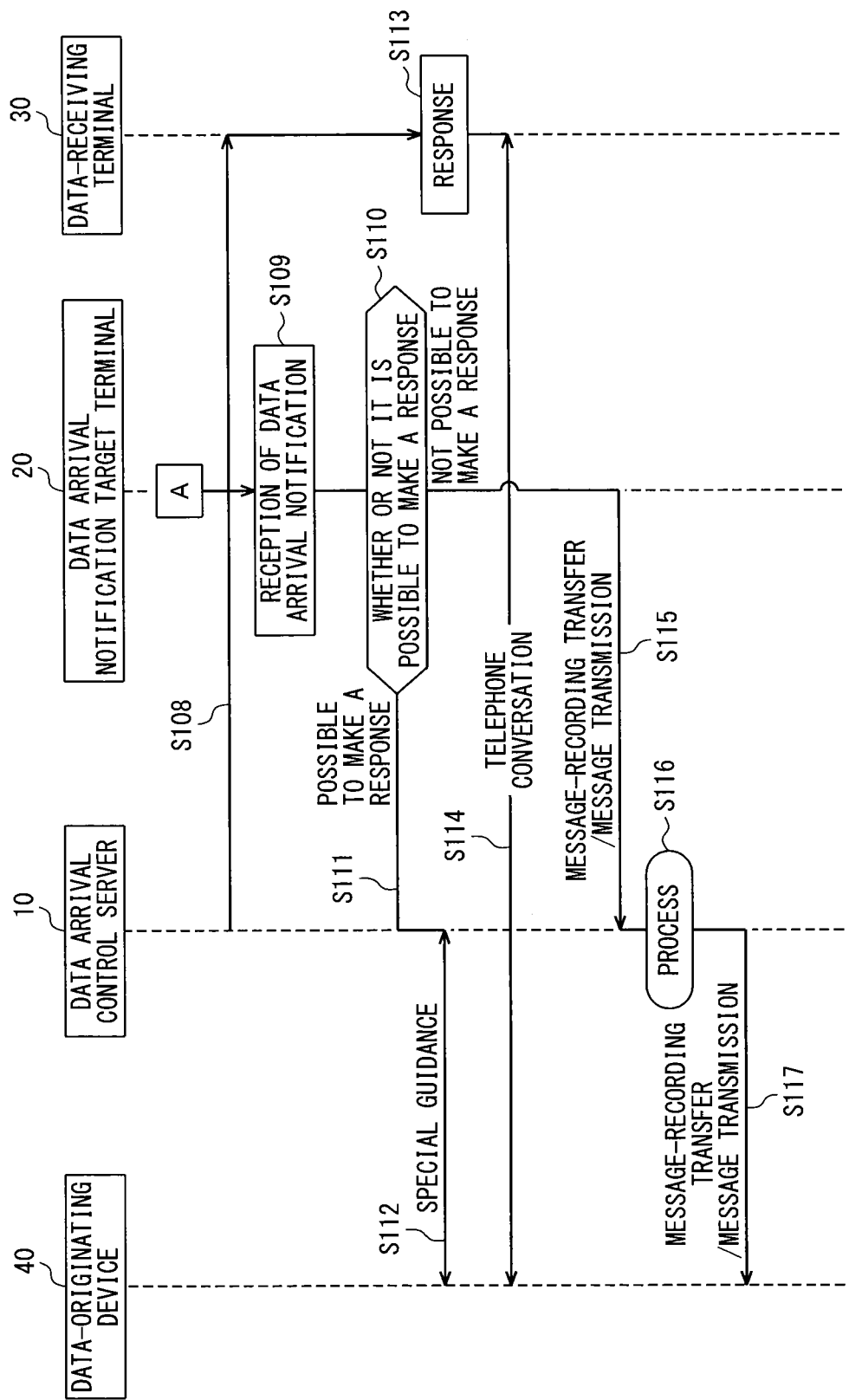
FIG. 7 is a sequence chart illustrative of the data arrival notification process according to the embodiment of the present invention.

In the present example, the data arrival control server 10 transmits the data arrival notification to the data arrival notification target terminal 20 at step S107 of FIG. 5, and in addition, transmits a data arrival signal to the data-receiving terminal 30 (step S108 of FIG. 7).

When the information transmission and reception unit 24 of the data arrival notification target terminal 20 receives the data arrival notification from the data arrival control server 10 (step S109), the data arrival notification application unit 21 determines whether or not it is possible to make a response based upon the user's input into the terminal operation unit 23 (step S110).

When it is determined that it is possible to make a response, the data arrival notification application unit 21 transmits a notification that it is possible to make a response via the information transmission and reception unit 24 to the data arrival control server 10 (step S111).

When the information transmission and reception unit 15 of the data arrival control server 10 receives the notification that it is possible to make a response from the data arrival notification target terminal 20, the guidance transmission unit 144 transmits a special guidance via the information transmission and reception unit 15 to the data-originating device 40 (step S112).

When the user takes the data-receiving terminal 30 out of the user's bag, powers on the data-receiving terminal 30, and operates for making a response to a data arrival, the data-receiving terminal 30 transmits a signal for making a response to the data arrival (step S113). This connects the line of contact between the data-originating device 40 and the data-receiving terminal 30, thereby allowing the user of the data-originating device 40 and the user of the data-receiving terminal 30 to have a telephone conversation over the line of contact (step S114).

In contrast, when it is determined that it is not possible to make a response at step S111, the data arrival notification application unit 21 of the data arrival notification target terminal 20 transfers to the message-recording center or transmits a request signal of message transmission via the information transmission and reception unit 24, according to the user's operation (step S115).

When the information transmission and reception unit 15 of the data arrival control server 10 receives the request signal from the data arrival notification target terminal 20, the message-recording transfer unit 146 performs a message-recording transfer process in a case where the request signal represents a recording-message transfer request, and the message-recording transfer unit 146 synthesizes voices for a message generating process in a case where the request signal represents a message transmission request (step S116). The message-recording transfer unit 146 transmits a guidance of being connected to the message-recording center or the message combined with voices via the information transmission and reception unit 15 to the data-originating device 40 (step S117).

The above data arrival response process allows the user to notify the data-originating device 40 of an intention to make a response to the data arrival, if the user has such an intention and then look for the data-receiving terminal 30 in the bag in no hurry. Moreover, if the user does not have an intention to make a response to the data arrival, the user is allowed to make a message-recording transfer or transmit the message to the data-originating device 40.

Figure 8:
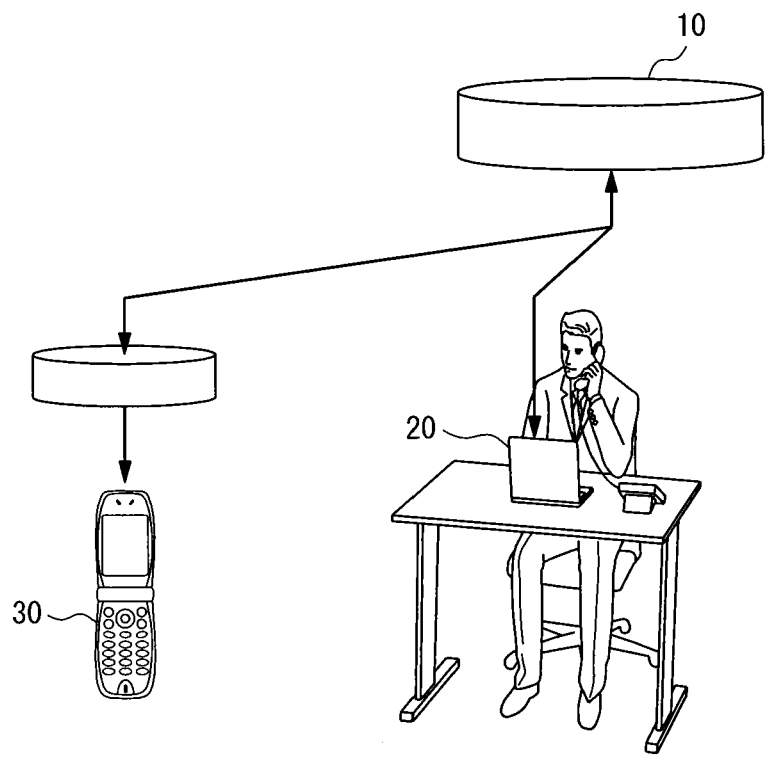
FIG. 8 is a diagram illustrative of an example of a data arrival in a case where the data arrival notification target terminal according to the embodiment of the present invention is a personal computer that is not equipped with a telephone call receiving function or a speaker and a data-receiving terminal is a mobile telephone.

As described heretofore, when there is a data arrival at the data-receiving terminal 30 among plural communication terminals used by a user, the data arrival control server 10 notifies the data arrival notification target terminal 20, which has been set beforehand as a data arrival destination, that there is a data arrival at the data-receiving terminal 30. Accordingly, even if the data-receiving terminal 30 does not have means of notifying the user of a data arrival such as a ringtone or a vibrator function, or even if the data-receiving terminal 30 is powered off, the user is able to know in real time that there is a data arrival at the data-receiving terminal 30 by use of the data arrival notification target terminal 20 and confirm the content of the data arrival or take an action for the power that is off. Likewise, even in a case where the schedule data, which can be used only by the data-receiving terminal 30, and which is used by a scheduler shared by a certain group is updated, the user is able to know the update in real time. Furthermore, even in a case where the data arrival notification target terminal 20 is a personal computer without a telephone call answering function or a speaker and the data-receiving terminal 30 is a mobile terminal, the fact of a data arrival is displayed on a screen of the personal computer as illustrated in FIG. 8, so that the user can have an actual telephone conversation over the mobile terminal. In this manner, the data arrival notification process is performed in cooperation with the data arrival notification target terminal 20 having different capabilities or states from those of the data-receiving terminal 30, thereby improving the convenience of the user who uses plural communication terminals. In addition, any combination with the present invention and services provided by the communication operator enhances customer services.

Furthermore, since the data arrival terminal is not changed, there arises no problem in the management of data arrival history or e-mail history. Moreover, the data arrival terminal needs not to be fixed at one of communication terminals used by a user.

Additionally, the relationship between the service-specific identifier to be used for a Web service or the like and the terminal identifier is registered in the terminal identifier management DB 11, thereby making it possible to derive the terminal identifier from the service-specific identifier. Accordingly, even in a case where the data arrival has a specific identifier used for a service other than the mobile communication service as a destination, it is made possible to perform a data arrival notification to the data-receiving terminal 30 identified by the above specific identifier. Moreover, even in a case where a data arrival is made by a service without data arrival notification means like a pull-type application such as an e-mail or the like, it is made possible to make a data arrival notification to a user.

In addition, the data arrival notification is performed by referring to the terminal state of the data-receiving terminal 30 stored in the terminal state holding DB 12. Hence, the data arrival notification is enabled based upon the terminal state held only in a mobile communication network, unlike mere e-mail transfer from a service providing source. Furthermore, a condition for the data arrival notification process is registered beforehand in the user setting information holding DB 13. This enables reception of a data arrival notification only in a case where the data arrival matches the desired condition.

MODIFICATIONS TO THE EMBODIMENTS

While the preferred embodiments of the present invention have been described in detail, it should be apparent that various modifications to those embodiments may occur without departing from the scope of the present invention as set forth in the following claims. Modifications are conceivable as follows.

(1) In the above embodiments, the description has been given that a user uses two communication terminals of the data arrival notification target terminal 20 and the data-receiving terminal 30. However, the present invention is not limited to this. Three or more communication terminals may be used. In a case where three or more communication terminals are used, one of them may be decided to be a data arrival communication (notification?) target terminal all the time. The data arrival notification target terminal may be decided based upon the user setting information stored in the user setting information holding DB 13, when each of the communication terminals is a data-receiving terminal.

(2) The order of the terminal identifier derivation process at step S102, the state determination process at step S103, and the user setting confirmation process at step S105 may be changed.

Figure 9:
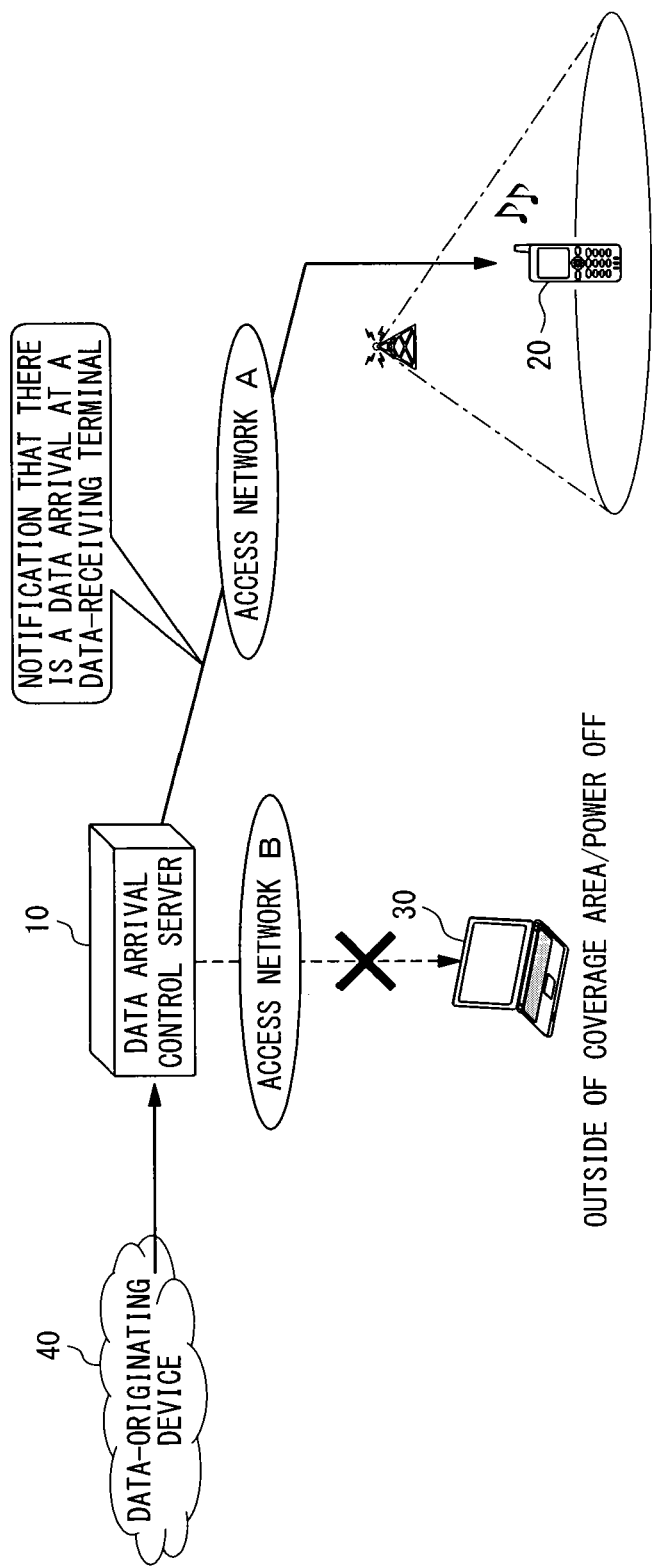
FIG. 9 is a diagram illustrative of a case where a data arrival notification target terminal and the data-receiving terminal are located in different networks according to a modification of the present invention.

(3) Referring to FIG. 9, the data arrival notification target terminal 20 and the data-receiving terminal 30 may be located in different networks (in an access network A and an access network B, respectively, in the drawing). Also in this case, the data-originating device 40 makes a signal/data transmission to the data arrival control server 10, thereby allowing the data arrival notification to the data arrival notification target terminal 20.

For instance, this modification is effective in a case where the communication terminals used by a user are selectively used in such a manner that a mobile telephone employs the W-CSMA with a wide coverage area and a smartphone utilizes Super 3G of wideband or a public wireless LAN service.

An example is that when the data-receiving terminal 30 is a personal computer and the personal computer is located at the outside of the coverage area of the network of the public wireless LAN or the like, the user is not able to know a data arrival at the personal computer conventionally. In the present modification, when the data arrival notification to the data arrival notification target terminal 20 is recognized, it is made possible for the user to connect the personal computer to the network as necessary.

As other networks, mobile radio communication networks (2G, 3G, S3G), Non 3GPP Access (WiMAX, I-WLAN) are conceivable. Additionally, in a case where the data arrival notification target terminal 20 is located in a coverage area of a network operated by another network operator that is different from the network operator with which a user makes a contract for communication services, a uniquely determined ID for identifying the user is shared by the network operator and another network operator as a terminal identifier. Such an ID is managed by the data arrival control server 10, thereby enabling the data arrival notification.

Figure 10:
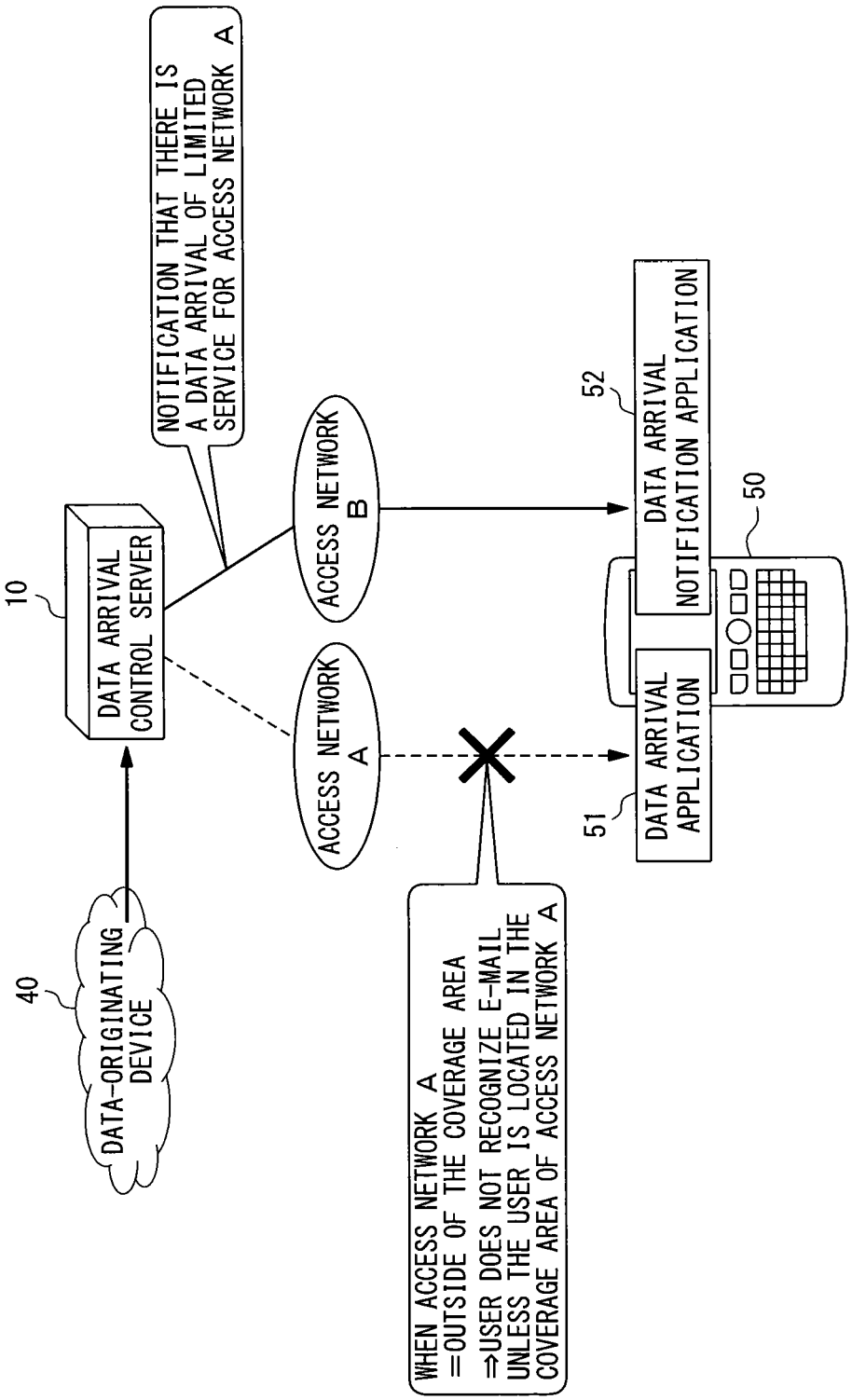
FIG. 10 is a diagram illustrative of a case where a terminal for receiving a call or data and a terminal for receiving a data arrival notification are the same according to a modification of the present invention.

(4) As another modification, a description will be given of an example in which a data arrival notification application program stored in the data-receiving terminal 30 and a data arrival notification application program stored in the data arrival notification target terminal 20 are stored in a single communication terminal and a data arrival and a data arrival notification are received by the single communication terminal. FIG. 10 illustrates a communication terminal 50 for receiving both the data arrival and the data arrival notification.

It is assumed that the communication terminal 50 is capable of accessing two or more different networks, and the service that the communication terminal 50 can receive is different depending on the network. In the example illustrated in FIG. 10, the communication terminal 50 is capable of accessing an access network A and an access network B. It is also assumed that a non-volatile memory, not illustrated, of the communication terminal 50 stores the data arrival application program for receiving a data arrival of a service provided only in the access network A and the data arrival notification application program for receiving a data arrival notification. It is further assumed that a CPU, not illustrated, of the communication terminal 50 executes processing according to the data arrival application program, thereby accomplishing a data arrival application 51 that is a function of receiving a service via the access network A. It is further assumed that the CPU of the communication terminal 50 executes processing according to the data arrival notification application program, thereby accomplishing a data arrival notification application 52 that is a function of receiving a data arrival notification.

When there is a data arrival for a service limited to the access network A at the communication terminal 50 that is located at the outside of the coverage area of the access network A, the communication terminal 50 is not capable of accessing the access network A and the data arrival application 51 is not capable of receiving a data arrival. In the present modification, however, the data arrival notification unit 143 of the data arrival control server 10 is capable of notifying the data arrival notification application 52 of the communication terminal 50 via the access network B to which the communication terminal 50 is capable of making an access.

For example, in a case where a voice service is provided only in the access network A and there is a data arrival for the voice service via the access network A from the data-originating device 40, the data-originating device 40 is connected to a message-recording service center to record a message at the message-recording service center from the data-originating device 40. Then, the data arrival control server 10 has to notify a user that the message is recorded. However, conventionally, the data arrival control server 10 notifies the user, when the data arrival control server 10 recognizes that the communication terminal 50 is located in the coverage area of the access network A. In contrast, according to the present modification, when the communication terminal 50 is located in the coverage area of the access network B, the data arrival control server 10 notifies the data arrival notification application 52 of the access network B, allowing the user to know the data arrival.

Moreover, when the communication terminal is located in the coverage area of the access network A and the data arrival application 51 is successful in the data arrival, a data arrival notification may be made to the data arrival notification application 52. This modification is effective in a case where the data arrival application 51 does not have a function of the data arrival notification.

As a further extended example, it is made possible for the user who has known a data arrival to download a file of a recorded message by use of the http communication and play the file on the communication terminal 50, instead of being located in the access network A that provides the voice service again to listen to the recorded message.

Figure 11:
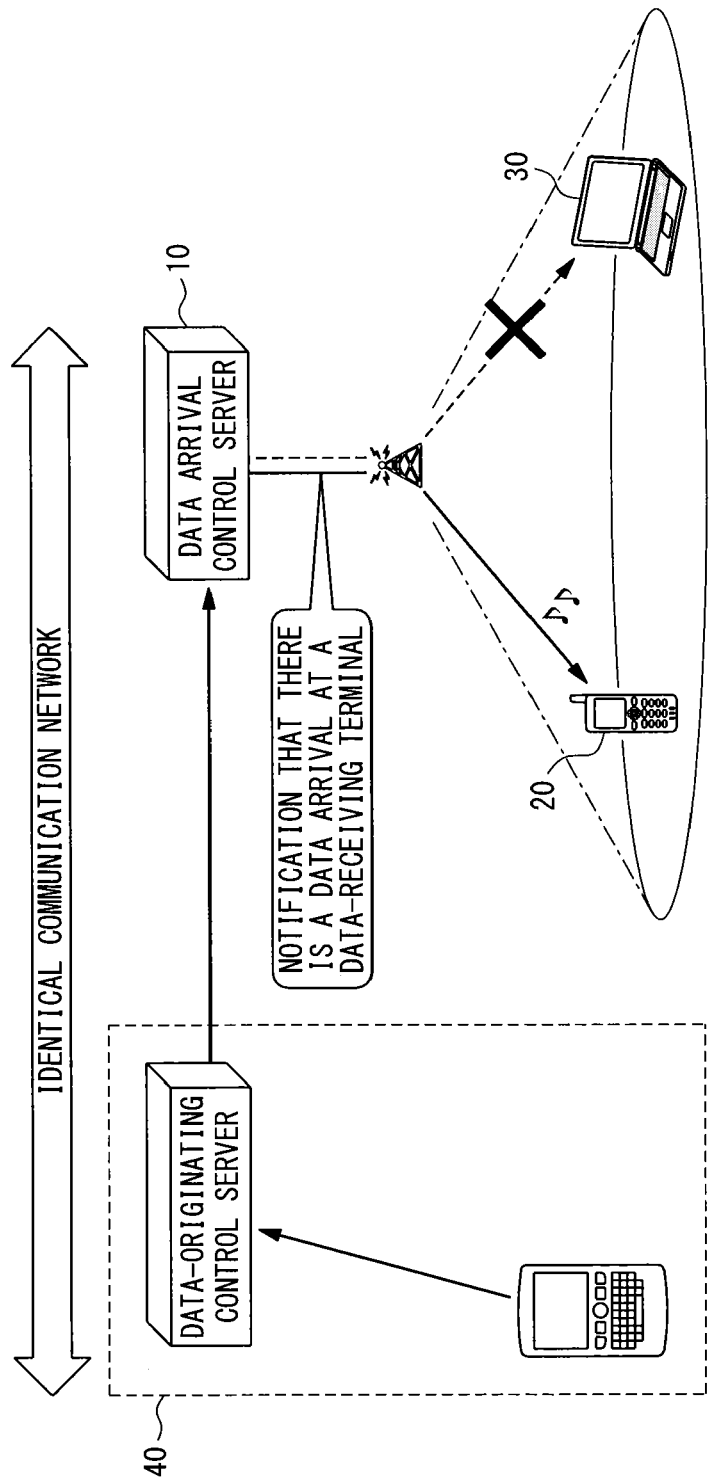
FIG. 11 is a diagram illustrative of a case where a communication network of a data-originating side and a data-receiving side are the same.

(5) Specifically, as illustrated in FIG. 11, the communication network of the data-originating side and that of the data-receiving side may be the same in all of the embodiments.

REFERENCE SIGNS LIST

10 data arrival control server
11 terminal identifier management DB
12 terminal state holding DB
13 user setting information holding DB
14 data arrival notification application unit
141 data-receiving terminal state determination unit
142 transmission destination terminal identifier derivation unit
143 data arrival notification unit
144 guidance transmission unit
145 connection unit
146 message-recording transfer unit
15 information transmission and reception unit
20 data arrival notification target terminal
21 data arrival notification application unit
22 screen display unit
23 terminal operation unit
24 information transmission and reception unit
30 data-receiving terminal
40 data-originating device

The invention claimed is:

1. A data arrival control server for controlling a data arrival, when there is the data arrival at any one of a plurality of communication terminals used by a user, the data arrival control server comprising:
   a data arrival notification unit for, when there is the data arrival at a certain communication terminal of the plurality of communication terminals used by the user, performing a data arrival notification process of notifying another communication terminal of the plurality of communication terminals that there is the data arrival at the certain communication terminal of the plurality of communication terminals; and
   a user setting information holding unit for storing user setting information representing a condition, for the data arrival notification process, set by the user,
   wherein the user setting information indicates that an e-mail arrival notification is made to the another communication terminal, when there is an arrival of e-mail from a communication terminal used by a first data sender to the certain communication terminal and the certain communication terminal is powered OFF, and the user setting information indicates that a data arrival notification is made to the another communication terminal regardless of a state of the certain communication terminal, when there is an update notification of schedule data used by a scheduler held by a communication terminal used by a second data sender to the certain communication terminal.

2. The data arrival control server according to claim 1, further comprising:
   a terminal state holding unit for storing a state of each of the plurality of communication terminals; and
   a data-receiving terminal state determination unit for, when there is the data arrival at the certain communication terminal, determining whether or not the certain communication terminal is capable of receiving data based upon the state of the certain communication terminal,
   wherein the data arrival notification unit performs the data arrival notification process, when the data-receiving terminal state determination unit determines that the certain communication terminal is not capable of receiving the data.

3. The data arrival control server according to claim 1 or 2, wherein the data arrival notification unit performs the data arrival notification process on the condition represented by the user setting information, for the certain communication terminal, stored in the user setting information holding unit, when there is the data arrival at the certain communication terminal.

4. The data arrival control server according to claim 3, wherein the user setting information includes information representing a data transmitter, a data type, a data transmitting condition, and a communication terminal to be notified that there is the data arrival in a case where the data transmitting condition is satisfied, when there is the data arrival having the data type from a communication terminal used by the data transmitter.

5. The data arrival control server according to claim 1, further comprising:
   a terminal identifier management unit for managing a terminal identifier assigned to the certain communication terminal and a service-specific identifier to be used when the user who uses the certain communication terminal receives a prescribed type of communication service, in association with each other; and
   a transmission destination terminal identifier derivation unit for deriving the terminal identifier from the service-specific identifier, based upon data managed by the terminal identifier management unit, when there is the data arrival with the service-specific identifier as a destination.

6. The data arrival control server according claim 1, further comprising:
   a guidance transmission unit for transmitting a guidance of notifying a data-originating device that it is possible to make a response, in receipt of a reply that it is possible to make a response to a telephone call notification from the data arrival notification unit; and
   a connection unit for connecting a line of contact between the data-originating device and the certain communication terminal, when there is a reply from the certain communication terminal.

7. The data arrival control server according to claim 1, further comprising a message-recording transfer unit for transferring the data arrival to a message-recording center having a recording device capable of recording a voice message to the certain communication terminal, in receipt of a reply that it is not possible to make a response to a telephone call notification from the data arrival notification unit.

8. The data arrival control server according to claim 1, wherein:

the data arrival notification unit performs the data arrival notification process by use of a terminal identifier for uniquely identifying the another communication terminal in a communication network where the another communication terminal is located, and the terminal identifier includes a common terminal identifier capable of uniquely identifying the another communication terminal in each of a plurality of communication networks operated by different communication operators, respectively.

9. A data arrival control method for controlling a data arrival, when there is the data arrival at any one of a plurality of communication terminals used by a user, the data arrival control method comprising:

when there is the data arrival at a certain communication terminal of the plurality of communication terminals used by the user, performing a data arrival notification process of notifying another communication terminal of the plurality of communication terminals that there is the data arrival at the certain communication terminal of the plurality of communication terminals, user setting information is stored in a user setting information holding unit, the user setting information being set by the user and representing a condition for the data arrival notification process, wherein the user setting information indicates that an e-mail arrival notification is made to the another communication terminal, when there is an arrival of e-mail from a communication terminal used by a first data sender to the certain communication terminal and the certain communication terminal is powered OFF, and the user setting information indicates that a data arrival notification is made to the another communication terminal regardless of a state of the certain communication terminal, when there is an update notification of schedule data used by a scheduler held by a communication terminal used by a second data sender to the certain communication terminal.

\* \* \* \* \*